No. 753,969. PATENTED MAR. 8, 1904.
T. FEE.
PIPE HANGER.
APPLICATION FILED MAR. 5, 1902.
NO MODEL.

No. 753,969.

Patented March 8, 1904.

UNITED STATES PATENT OFFICE.

THOMAS FEE, OF BROOKLYN, NEW YORK.

PIPE-HANGER.

SPECIFICATION forming part of Letters Patent No. 753,969, dated March 8, 1904.

Application filed March 5, 1902. Serial No. 96,763. (No model.)

*To all whom it may concern:*

Be it known that I, THOMAS FEE, a citizen of the United States of America, and a resident of the borough of Brooklyn, city of New York, county of Kings, State of New York, have invented certain new and useful Improvements in Pipe-Hangers, of which the following is a specification.

This invention has reference to an improvement in pipe-hangers, contemplating a device of this type wherein the same is formed in sections hinged to one another and receiving the pipe between semicircular parts carried by each, the free ends of the stem being secured against outward and downward movement by means of rows of teeth formed on the same engaging internal teeth of a sleeve-provided plate and enabling adjustment of the hanger vertically.

Figure 1:
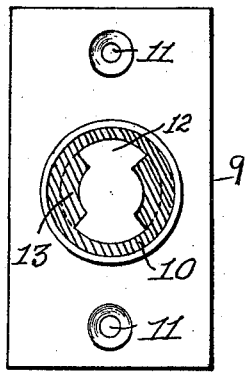
Figure 2:
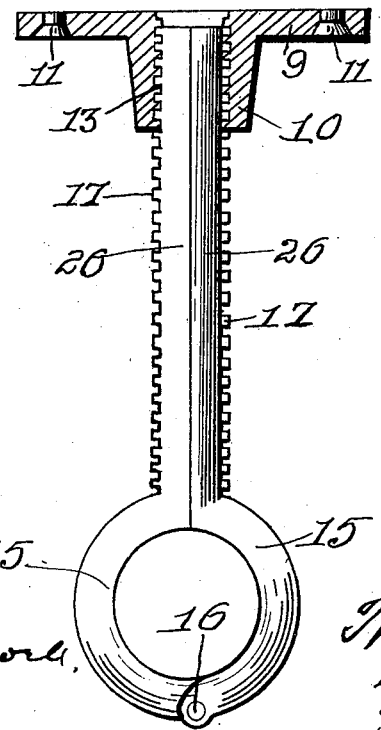

In the accompanying drawings, Figure 1 is a horizontal section through the sleeve of the plate; and Fig. 2 a side elevation of the device, showing the parts in their relative relations and the sleeve-provided plate in section.

9 designates the plate, formed with screw or bolt holes 11, through which the preferred fastening means pass to retain the plate in its stationary position. A sleeve 10 depends from this plate and interiorly is formed with rows of grooves 13, oppositely disposed, receiving the teeth of the stem to be referred to. As seen in Fig. 1, there are formed between the projections formed by the grooves 13 clear spaces 12. The stem 26 is split, forming sections, each of which is constructed with a semicircular part 15 15, hinged to each other, as at 16. The two portions of this stem are each provided with rows of teeth 17 to be received in the spaces 12 when inserted in the sleeve and when the stem is partially revolved after proper vertical adjustment to engage the teeth formed by grooves 13, thereby retaining the stem-sections against outward and downward movement.

Such modification may be resorted to as falls within the spirit of the invention as evidenced by the claims.

Having thus fully described my invention, what I claim as new, and desire to secure by Letters Patent, is—

1. In combination with a hollow sleeve formed with two series of oppositely-disposed transverse grooves, of a stem formed in two sections having their lower ends pivoted together and their upper ends freely movable with relation to each other, each stem having teeth on its periphery for engagement in the grooves of said sleeve, said sleeve retaining said upper ends of the stem-sections in a closed position, and against outward and downward movement.

2. In combination with a hollow sleeve formed with series of oppositely-disposed transverse grooves on its interior, of a stem formed in two sections, the lower ends of which are pivoted together, and the upper ends of which are freely movable with relation to each other, each stem having teeth on its periphery, the teeth of one stem located opposite the teeth of the other stem, said stems when in their closed position being received in said sleeve and having the teeth thereof engaging in the grooves of said sleeve, said teeth supporting the stems against downward movement by engagement with the ungrooved space formed by said sleeve-grooves, said stems being retained against outward movement by engagement of the teeth thereof in the sleeve-grooves.

Signed at New York, N. Y., this 3d day of March, 1902.

THOMAS FEE.

Witnesses:
JOHN H. HAZELTON,
M. L. SHAY.